Nov. 18, 1952    R. D. BREMER    2,618,731
ELECTRICAL HEATING UNIT
Filed June 29, 1951

INVENTOR.
ROBERT D. BREMER.
BY
Willets, Hardman & Fehr.

Patented Nov. 18, 1952

2,618,731

UNITED STATES PATENT OFFICE 2,618,731

ELECTRICAL HEATING UNIT

Robert D. Bremer, Dayton, Ohio, assignor to General Motors Corporation, Dayton, Ohio, a corporation of Delaware Application June 29, 1951, Serial No. 234,176

2 Claims. (Cl. 219—38)

My invention relates to heaters and particularly to electric heating units of the immersion type.

An object of my invention is to provide a novel and improved electric heating unit intended to be inserted into a water heater tank or container through an opening in a wall thereof and which unit is adapted to close the opening and to heat water contained in or passing through the tank.

Another object of my invention is to simplify the construction and arrangement of a closure connection for an insertable electric heating unit extended into a water heater tank or container and clamped at spaced apart points upon the container.

A further and more specific object of my invention is to provide an electric heating unit with a combined heater supporting and closure plate, which plate is stamped or punched from homogeneous sheet material and embossed and also preformed at certain portions thereof to increase the structural strength of the sheet material of the plate to prevent deflection and/or deformation thereof when the plate is being clamped at spaced apart points upon a hot water tank, container or the like.

With the foregoing and other objects in view as will hereinafter become apparent, my invention comprises the construction and arrangement of parts hereinafter set forth and shown in the accompanying drawing wherein.

Figure 1:
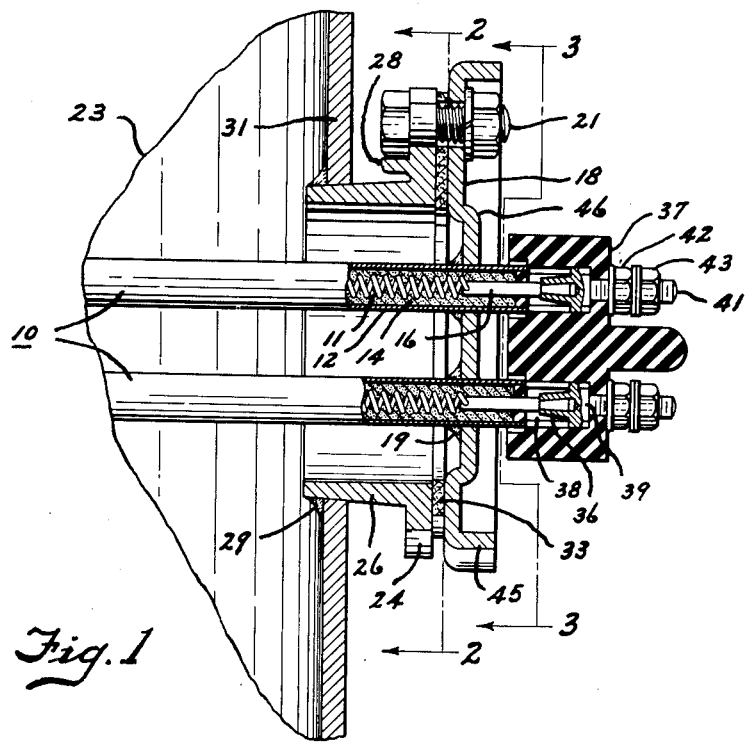
Fig. 1 is a sectional view taken on the line 1—1 of Fig. 3 showing a fragment of a water tank and an electrical heater clamped thereto and extending therein.

Referring to the drawing I show, in Fig. 1 thereof, a sheathed electrical heater or heating element 10 of the so-called looped or hairpin type. Such heaters are conventional in the art and may be formed in any of the various ways now known and bent into the shape desired. Heater 10 preferably comprises a helical resistance wire 11 surrounded by a seamless and bendable metal sheath or copper tube 12 from which it is spaced and insulated by a highly compacted mass of granular insulating material 14 preferably of good heat conductivity. Terminal or terminal leads 16 have their inner ends embedded in the compacted insulating filler material 14 and may extend outwardly of the sheath 12. The ends of the wire resistor 11 are secured in any suitable or well-known manner to the inner ends of the terminal leads 16. Heating element 10 has its ends passing through openings provided in a substantially rectangular combined supporting and closure plate 18, to be hereinafter more specifically described, and the portion of the copper sheath thereof adjacent its ends is sealed, as by silver solder material 19, to the plate 18. This plate 18 is adapted to be clamped, at a plurality of spaced apart points, by bolts 21, upon a wall of a round water heater tank or container 23 as is common in the art.

Figures 2, 3:
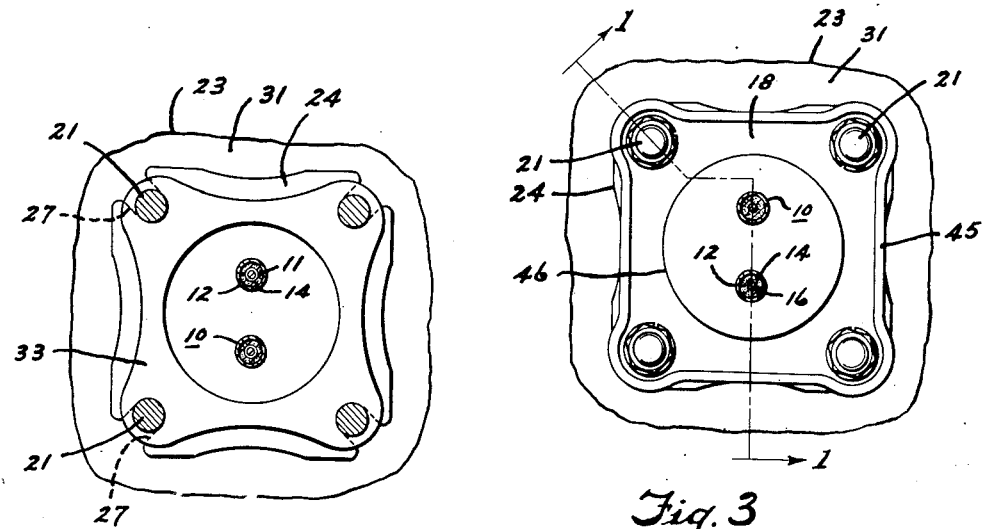
Fig. 2 is a sectional view, on a slightly reduced scale, taken on the line 2—2 of Fig. 1 showing a gasket in place on a portion of the water tank to which the supporting plate of an electric heating unit is clamped; and, Fig. 3 is a sectional view taken on the line 3—3 of Fig. 1 showing the planular contour of the supporting and closure plate of the electric heating unit of my invention.

In the present disclosure, plate 18 is clamped upon a flared portion 24 of a steel collar 26, having a round opening therethrough, by the bolts 21 which are received in slots 27 (see Fig. 2) extending inwardly from the edge of the corners of the flared portion 24. Bosses 28 on the flared portion 24 of collar 26, inwardly of the slots 27 (see Fig. 1), may engage the head of bolts 21 and prevent their turning while the bolt nuts are being tightened. Steel collar 26 is welded, as at 29 in any suitable or conventional manner, to the wall 31 of tank or container 23. A gasket 33 of a suitable or desired material is interposed between the outer face of flared collar 26 and the inner face or side of plate 18 to close the opening in the tank 23 through which the electric heating unit projects into the container or tank 23.

The outer ends of the terminals or terminal leads 16 are secured in holes provided in terminal studs 36 after which the walls of the holes are spun over or pressed inwardly against the terminal leads 16 to provide a substantially permanent connection therewith. An insulating block 37 is provided with hexagonally-shaped openings 38 for receiving a hexagonally-shaped enlargement 39 on studs 36. Block 37 is also provided with round holes for receiving a threaded shank portion 41 on studs 36, and a nut 42 holds the insulating block 37 on the heating unit, comprising the heating element 10 and plate 18. Another nut 43 threaded upon the threads of shank portion 41 of terminals 36 cooperates with each of the nuts 42 to provide for the clamping of electric wire connections to the heating unit.

Plate 18 is substantially rectangular in planular view and is stamped from homogeneous sheet material such, for example, as brass, which facilitates the soldering or brazing of copper sheath 12 of heating element 10 to this plate. Plate 18 has portions overlying the opening in tank 23 or, in other words, the round or circular opening in collar 26 and has its inner side exposed to a substance within the tank or container 23. Plate 18 after being stamped from a homogeneous sheet of brass and pierced to provide the holes for receiving the heating element 10 and bolts 21 then has its peripheral edges bent laterally to form a flange 45 extending continuously around the plate (see Fig. 3). Plate 18 is also embossed centrally thereof and inwardly of the continuous flange 45 as at 46. The embossation 46 is cylindrical in planular form and projects or extends in the same direction of extension of the flange 45. Since plate 18 is formed from homogeneous sheet material, the integral continuous flange 45 and the cylindrical embossation 46 thereof cooperate with one another to increase the structural strength and rigidity of the plate particularly against being deflected and/or deformed at its overlying clamping portions relative to other portions thereof when the same is clamped upon the tank or container 23. Without strengthening plate 18 in the manner prescribed, its flat clamping surface may be bowed or deflected out of its original straight line shape, during tightening of bolts 21, and thereby impair proper sealing of the opening in the tank or container.

By virtue of plate 18 being formed from a piece of homogeneous metal, such as sheet brass or stainless steel, that portion thereof exposed to or in contact with a substance within the heater tank or container 23 is substantially chemically inactive with respect to the deleterious reaction with the substance in the container particularly under the action of heating water in the vicinity of the closure plate. Plate 18 consequently prevents deterioration, such as corrosion, and subsequent destruction of such exposed surface of a closure plate as well as preventing contamination of the substance within the container. My single combined reinforced clamping and closure plate insures the withdrawal of uncontaminated water from a water heater tank, and this is of high importance in certain industrial and other uses where pure hot water is required. Reference herein to a homogeneous plate is employed to distinguish my invention from other prior closure plates that have been covered by a lamination of a non-reactive material or plated with the same at the point of exposure to substance contained in a container.

From the foregoing, it should be apparent that I have provided a simplified and improved closure plate construction for an opening in a tank adapted to have an electric heating element inserted therethrough. By forming the plate from homogeneous sheet material and increasing its structural strength and rigidity as herein described, a single plate serves the dual purpose of permitting it to be exposed to the substance within a container and of being clamped upon a container without being deflected under the clamping action. Thus, the necessity of providing a separate clamping plate over a protective layer or plate at that portion of a unit employed to close an electric heater insertion opening in a water heater tank is eliminated.

While the form of embodiment of the present invention as herein disclosed constitutes a preferred form, it is to be understood that other forms might be adopted, as may come within the scope of the claims which follow.

What is claimed is as follows:

1. A device adapted to close a round opening in a container and to heat a substance within the container, said device comprising a single clamping and closure plate carrying a heater and adapted to be secured to the container without the use of additional backing means, said plate having a flat sealing portion overlying the wall of said container margining the opening therein with its inner side exposed to substance within the container, said heater being in the form of a sheathed electric element passing through and being fixedly secured to said single closure plate, said element extending into the container through the opening therein with its terminals accessible from exteriorly of said closure plate, holes through said single plate adapted to receive, at spaced apart points about said container opening, separate individual clamping means for securing the same to said container, said plate being stamped from homogeneous sheet material inactive with respect to the deleterious reaction with substance in the container and being of uniform thickness throughout, and the periphery of said plate adjacent the holes therethrough being bent laterally to form a continuous flange therearound for increasing the rigidity of the plate to prevent deformation thereof in the vicinity of its attachment to said container by said clamping means.

2. A device adapted to close a round opening in a container and to heat a substance within the container, said device comprising a single rectangularly shaped single clamping and closure plate carrying a heater and adapted to be secured to the container without the use of additional backing means, said plate having a flat sealing portion overlying the wall of said container margining the opening therein with its inner side exposed to substance within the container, said heater being in the form of a sheathed electric element passing through and being fixedly secured to said single closure plate, said element extending into the container through the opening therein with its terminals accessible from exteriorly of said closure plate, holes at the corners of said rectangular plate extending through the flat sealing portion thereof and adapted to receive, at spaced apart points about said container opening, separate individual clamping means for securing the same to said container, said plate being stamped from homogeneous sheet metal inactive with respect to the deleterious reaction with substance in the container and being of uniform thickness throughout, the periphery of said rectangular plate adjacent the holes therethrough being bent laterally to form a continuous flange therearound for increasing the rigidity of the plate to prevent deformation thereof in the vicinity of its attachment to said container by said clamping means, said rectangular closure plate having a central substantially circular embossed portion therein inwardly of said flat sealing portion thereof, and said embossed portion of said plate increasing the rigidity of that portion thereof exposed to substance within the container.

ROBERT D. BREMER.

REFERENCES CITED

The following references are of record in the file of this patent:

UNITED STATES PATENTS

| Number | Name | Date |
| --- | --- | --- |
| 1,671,592 | Kercher et al. | May 29, 1928 |
| 2,274,445 | Greer | Feb. 24, 1942 |
| 2,471,609 | Charbonneau | May 31, 1949 |
| 2,550,751 | Adams | May 1, 1951 |